(12) United States Patent
Beste

(10) Patent No.: US 11,725,264 B2
(45) Date of Patent: Aug. 15, 2023

(54) HIGH HARDNESS 3D PRINTED STEEL PRODUCT

(71) Applicant: VBN COMPONENTS AB, Uppsala (SE)

(72) Inventor: Ulrik Beste, Björklinge (SE)

(73) Assignee: VBN COMPONENTS AB

( * ) Notice: Subject to any disclaimer, the term of this patent is extended or adjusted under 35 U.S.C. 154(b) by 289 days.

(21) Appl. No.: 16/755,846

(22) PCT Filed: Nov. 22, 2018

(86) PCT No.: PCT/SE2018/051205
§ 371 (c)(1),
(2) Date: Apr. 13, 2020

(87) PCT Pub. No.: WO2019/103686
PCT Pub. Date: May 31, 2019

(65) Prior Publication Data
US 2020/0283876 A1  Sep. 10, 2020

(30) Foreign Application Priority Data
Nov. 22, 2017 (SE) .................................. 1751438-1

(51) Int. Cl.
| | |
|---|---|
| *C22C 33/02* | (2006.01) |
| *B33Y 70/00* | (2020.01) |
| *B23K 26/12* | (2014.01) |
| *B23K 26/342* | (2014.01) |
| *B23K 15/00* | (2006.01) |
| *B23K 15/06* | (2006.01) |
| *B23K 28/00* | (2006.01) |
| *C22C 38/22* | (2006.01) |
| *C22C 38/24* | (2006.01) |
| *C22C 38/30* | (2006.01) |
| *C22C 38/36* | (2006.01) |
| *B22F 10/28* | (2021.01) |
| *B22F 10/32* | (2021.01) |
| *B22F 10/64* | (2021.01) |
| *B22F 10/34* | (2021.01) |
| *B22F 10/50* | (2021.01) |
| *B33Y 10/00* | (2015.01) |
| *B33Y 80/00* | (2015.01) |
| *B22F 5/00* | (2006.01) |
| *B22F 10/362* | (2021.01) |
| *B22F 10/66* | (2021.01) |
| *B22F 1/065* | (2022.01) |

(52) U.S. Cl.
CPC .......... *C22C 33/0285* (2013.01); *B22F 10/28* (2021.01); *B22F 10/32* (2021.01); *B22F 10/34* (2021.01); *B22F 10/50* (2021.01); *B22F 10/64* (2021.01); *B23K 15/0086* (2013.01); *B23K 15/0093* (2013.01); *B23K 15/06* (2013.01); *B23K 26/123* (2013.01); *B23K 26/127* (2013.01); *B23K 26/1224* (2015.10); *B23K 26/342* (2015.10); *B23K 28/003* (2013.01); *B33Y 70/00* (2014.12); *C22C 38/22* (2013.01); *C22C 38/24* (2013.01); *C22C 38/30* (2013.01); *C22C 38/36* (2013.01); *B22F 1/065* (2022.01); *B22F 10/362* (2021.01); *B22F 10/66* (2021.01); *B22F 2005/001* (2013.01); *B33Y 10/00* (2014.12); *B33Y 80/00* (2014.12)

(58) Field of Classification Search
CPC ..................................................... C22C 38/36
See application file for complete search history.

(56) References Cited

U.S. PATENT DOCUMENTS

| | | | |
|---|---|---|---|
| 4,869,625 A * | 9/1989 | Stone ................... | B23B 51/108 |
| | | | 408/118 |
| 5,525,140 A | 6/1996 | Wisell | |
| 6,057,045 A | 5/2000 | Wojcieszynski et al. | |

FOREIGN PATENT DOCUMENTS

| | | |
|---|---|---|
| CN | 105562690 A | 5/2016 |
| EP | 0377307 A1 | 7/1990 |
| EP | 2361704 A1 | 8/2011 |
| JP | S62-224529 A | 10/1987 |
| JP | H02 66139 A | 3/1990 |
| JP | H012-175846 A | 7/1990 |
| JP | H05 148510 A | 6/1993 |
| JP | H05 171375 A | 7/1993 |
| JP | H03193205 A | 5/1999 |
| WO | 2014/120264 | 8/2014 |

OTHER PUBLICATIONS

International Search Report for PCT/SE2018/051205, dated Apr. 11, 2019, 4 pages.
Office Action dated Aug. 23, 2022 with respect to Japanese App No. 2020-528177 (w/English Translation), 8 pages.

* cited by examiner

*Primary Examiner* — Christopher S Kessler
(74) *Attorney, Agent, or Firm* — Adsero IP

(57) ABSTRACT

The present invention relates to a 3D-printed iron based alloy product comprising carbon, tungsten, vanadium, cobalt, chromium and molybdenum with very high hardness and very good high temperature properties thermal properties as well as a method of preparing the 3D-printed product and a powder alloy.

16 Claims, 5 Drawing Sheets

HIGH HARDNESS 3D PRINTED STEEL PRODUCT

CROSS-REFERENCE TO RELATED APPLICATION

This application claims priority to and is a 35 U.S.C. § 371 national phase application of PCT/SE2018/051205 (WO2019/103686), filed on Nov. 22, 2018 entitled "HIGH HARDNESS 3D PRINTED STEEL PRODUCT", which application claims priority to and the benefit of Sweden Patent Application No. 1751438-1, filed Nov. 22, 2017, the disclosures of which are incorporated herein by reference in their entirety.

FIELD OF THE INVENTION

The present invention relates a 3D-printed product comprising iron based alloy and a method of preparing the 3D-printed product.

BACKGROUND

Material Processing Techniques

There are today a number of different manufacturing methods for obtaining high alloyed materials with high carbon content and high hardness. All the methods have advantages and disadvantages, and the choice is dependent on conflicting demands when it comes to quality and cost.

A common method is casting followed by forging/rolling of an ingot (a.k.a. wrought alloys). The desired alloy material is melted in a furnace and solidified in ingots. These ingots are then forged and rolled into bars of material which can have many different shapes and sizes. The advantage of this method is that it is a well-proven technology and it gives the possibility to produce materials with very high purities. There are numerous metallurgical technologies for improving the purity of metals. These include ladle treatments with or without vacuum treatment, ESR (Electro Slag Remelting), VIM/VAR, etc. De-oxidation of high carbon alloys can also be performed by exposing the molten alloy to vacuum. The carbon will then react with the oxygen and form carbon monoxide gas that can be removed by the vacuum pump.

"High purity" in these materials is usually synonymous with "low oxygen content" since in general the presence of oxygen results in oxide impurities which result in impaired properties of the material.

A major disadvantage with the common casting-ingot-technique is the long solidification times, resulting in coarse microstructures and solidification patterns. This is particularly the case for highly alloyed materials with high carbon content.

With a long solidification time, the carbides will form carbide structures which significantly reduce the mechanical properties of the material. A long solidification time will also result in a coarse microstructure in general, which also give impaired material properties. Another disadvantage is the need of subsequent forging and forming of the ingot to a metal bar (which typically is the end product in the material-processing plant). Forging and rolling are complex processes that require a number of heating and forming steps of the material ingot with resultant high energy losses. Highly alloyed materials are typically very difficult to form, and therefore require very high temperatures and high loads, which could result in cracked ingots, as well as high process costs. In other words, the fact that it must be possible to forge and/or to roll alloys made using this process limits the possibility of high alloying.

To overcome the problems caused by coarse microstructures it is possible to use Powder Metallurgy (PM). By first granulating ("atomizing") the desired molten alloy into a metal powder, a very fine microstructure can be achieved in the powder, due to the very quick solidification caused either by the atomization gas or other granulating techniques. The metal powder from gas atomization is formed typically of spherical shape with smaller powder particles stuck on the surface of the larger powder particles; "satellites". This metal powder can be put into capsules—metal sheet containers which can be cylindrical or near-net-shape. The containers can then be sealed and compacted by HIP (hot isostatic pressing), which is a common and well-known method. The result of the HIP is a fine structured metal bar (or near-net-shape component). One disadvantage is that the surface oxygen on every powder particle will give a higher oxygen content compared to a solidified large ingot as the oxygen accumulates on all the powder particles in the atomizing process. For PM-HIP of near-net-shape components, the need for capsule limits how complex a component can be. In addition, the difficulty to get the same powder size fraction in all parts of a complex capsule is limiting the needs for uniform quality in all parts.

For highly alloyed materials with high carbon content, the PM-HIP process typically is performed in quite large and uniform containers. But the resulting material still needs to be wrought by heating, forging and rolling to become a metal bar with the required dimensions. This is typically difficult for highly alloyed materials and, if even if it is possible, the resulting yield is sometimes low. Again, the need to be able to forge and/or roll the material limits the possibility for high alloying.

Forming a component from a PM-HIP material requires machining (turning, drilling, milling, etc.), in other words many additional process steps. Another problem with highly alloyed materials is that they also are difficult and expensive to machine and a lot of the expensive highly alloyed material is wasted during machining. The higher the wear resistance and hardness of an alloy, the more difficult it is to machine.

It is also possible to directly cast a molten material into a mold, so that the final shape of a component is nearly set when the cast has solidified. The disadvantages with casting are the formation of a coarse microstructure and solidification patterns due to long solidification times and the anisotropy in the component due to different solidification times at different sections. Furthermore, casting methods require a mold which sets the limit for how complex a component can be.

Another manufacturing method is to use metal powder, combine it with a binder of suitable kind, press the powder-binder-mix to a shape, and then sinter it. Sintering is usually performed by one of two methods: heating to remove binder and to get a diffusion coupling of the metal powders, or to get the metal powder partly melted and by that unified into a metal (liquid sintering). The major advantage with sintering methods is the possibility to unify materials with high melting points (typically cemented carbides or other pure ceramic materials). One type of sintering method is Metal Injection Molding (MIM), where a feedstock consisting of metal powders and a binder is pressed to a "green body" similar to plastic injection molding, and then the green body is sintered separately into the final component (which usually comprises pores).

The major disadvantages are: the size of the component changes during binder removal and diffusion, the need for compaction methods (pressing tools), the need of a binder and the removal of the binder (purity issues), limitations on the thickness or size of the product and porosity problems Another method to overcome the difficulties with a coarse microstructure in a highly alloyed material with high carbon content, and to avoid the need for machining of these difficult-to-machine materials, is to use additive manufacturing (AM, 3D-printing or free forming) methods. In AM, the highly alloyed metal powder is directly melted and solidified in the AM processing machine. A large number of different AM technologies exist but for metals the most common technique is metal powder bed melting. In this technique a metal powder is spread out and melted, by a laser or an electron beam, layer by layer, in a pattern based on a CAD drawing of the final product sliced into layers. The benefits are fine microstructure, complex shapes and high material yield. However, highly alloyed high carbon materials tend to crack when used in additive manufacturing processes where the materials are melted layer by layer and special care has to be taken to achieve a successful run.

PRIOR ART MATERIALS

U.S. Pat. No. 5,525,140 from Erasteel discloses iron based alloys having comprising carbon, chromium, molybdenum, tungsten, vanadium and cobalt. Alloys from Erasteel encompassed by this patent are known as ASP® such as ASP®2080. The hardness of the alloys after hardening at 1180° C. were at most 71HRC (alloy 16).

SUMMARY OF THE INVENTION

The object of the present invention is to present products of iron based alloys with very high hardness. The present invention overcome the drawbacks of the prior art of providing products of complex geometry by using 3D techniques. The present invention provides a new 3D-printing method and a new 3D-printed product comprising an iron-based alloy with Cr, W, Co, V and C. The product contains a high amount of carbides evenly distributed in the matrix. The mechanical properties of the material are more dependent on the maximum carbide size than the average carbide size since any fracture is most likely to occur at the site of the largest carbide.

The complex balance of different carbide formations, matrix solid solutions (especially of W), melting and solidification ranges are very difficult to handle, but the present patent invention solves this by adapting a unique combination of elements.

In a first aspect the present invention relates to a 3D-printed product made of a multiphase alloy comprising a metal matrix and grains of carbides embedded in the metal matrix;
wherein the alloy comprises
Carbon: equal to or greater than 2.47 and equal to or less than 2.55 weight %,
Tungsten: equal to or greater than 10 and equal to or less than 12 weight %,
Chromium: equal to or greater than 3.5 and equal to or less than 4.5 weight %
Cobalt: equal to or greater than 14 and equal to or less than 18 weight %;
Molybdenum: equal to or greater than 4 and equal to or less than 6 weight %;
Vanadium: equal to or greater than 5 and equal to or less than 8 weight %;
unavoidable amounts of impurities;
wherein the rest is iron; and
wherein the maximum carbide size less than 10 μm.

In a second aspect the present invention relates to 3D-printed product made of a multiphase alloy comprising a metal matrix and grains of carbides embedded in the metal matrix;
wherein the alloy comprises
Carbon: equal to or greater than 2.47 and equal to or less than 2.55 weight %,
Tungsten: equal to or greater than 10 and equal to or less than 12 weight %,
Chromium: equal to or greater than 3.5 and equal to or less than 4.5 weight %
Cobalt: equal to or greater than 14 and equal to or less than 18 weight %;
Molybdenum: equal to or greater than 4 and equal to or less than 6 weight %;
Vanadium: equal to or greater than 5 and equal to or less than 8 weight %;
unavoidable amounts of impurities;
wherein the rest is iron; and
wherein the total amount of carbide is 20-30 volume %.

In a third aspect the present invention relates to a 3D-printed product made of a multiphase alloy comprising a metal matrix and grains of carbides embedded in the metal matrix;
wherein the alloy comprises
Carbon: equal to or greater than 2.47 and equal to or less than 2.55 weight %,
Tungsten: equal to or greater than 10 and equal to or less than 12 weight %,
Chromium: equal to or greater than 3.5 and equal to or less than 4.5 weight %
Cobalt: equal to or greater than 14 and equal to or less than 18 weight %;
Molybdenum: equal to or greater than 4 and equal to or less than 6 weight %;
Vanadium: equal to or greater than 5 and equal to or less than 8 weight %;
unavoidable amounts of impurities;
wherein the rest is iron; and
wherein the product has a hardness of at least 1050 HV2 kg.

In a fourth aspect the present invention relates to a method of preparing a 3D-printed product in a free forming apparatus having a chamber the method comprising:
a. forming a layer of a powder of an iron based alloy on a base plate in an oxygen-low environment in the chamber wherein the alloy comprises:
Carbon: equal to or greater than 2.47 and equal to or less than 2.55 weight %,
Tungsten: equal to or greater than 10 and equal to or less than 12 weight %,
Chromium: equal to or greater than 3.5 and equal to or less than 4.5 weight %
Cobalt: equal to or greater than 14 and equal to or less than 18 weight %;
Molybdenum: equal to or greater than 4 and equal to or less than 6 weight %;
Vanadium: equal to or greater than 5 and equal to or less than 8 weight %;
unavoidable amounts of impurities;
wherein the rest is iron; and
wherein the powder comprises substantially spherical particles and/or substantially spherical particles;

b. melting the powder locally by exposing the powder to an energy beam during a sufficient period of time to form a melt pool; and c. letting the melted powder in the melt pool solidify into a multiphase alloy;

d. optionally preparing an additional layer of powder on top of the previous layer by repeating the steps a-d wherein step b comprises placing the powder on top of the previous layer; and wherein the product being built is kept heated above 600° C. during the method e. optionally hardening of the obtained product.

All the embodiments described herein are applicable to all the aspects of the present invention unless stated otherwise.

DETAILED DESCRIPTION OF THE INVENTION

Figure 1:
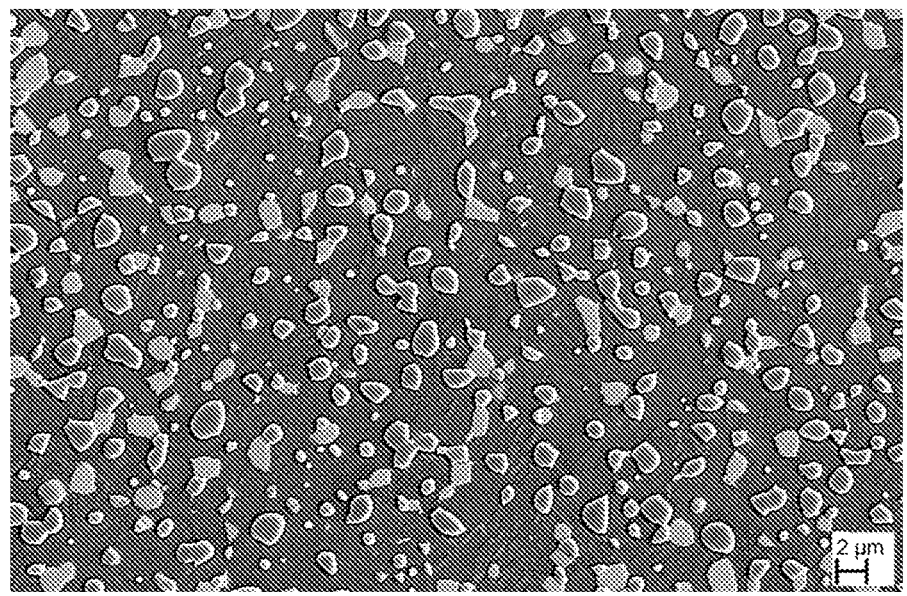
FIG. 1, SEM disclosing microstructure of a material sample according to the present invention after heat treatment according to method H1. An extremely high carbide content in combination with a very fine maximum carbide size. In the microstructure, the largest carbide that could be seen is 2.6 µm. The average carbide grain size is 0.92 µm and the total carbide content is as high as 25 vol %.

In the present application the term three-dimensional printing or 3D-printing or free forming or additive manufacturing denotes the same thing and is used interchangeably.

In the present application the term "melting point" or "melting temperature" denotes the same thing and is used interchangeably and denotes the liquidus point.

The 3D-Printed Product

The aim of the present invention is to present a three-dimensional (3D) printed product made of, or comprising, an iron-based alloy having high hardness and has good high temperature properties. The alloy comprises a metal matrix and grains of carbides embedded in the metal matrix. The alloy is based on iron (balance Fe) and further comprises chromium, tungsten, cobalt, vanadium, molybdenum and carbon. Preferably the alloy has a very low oxygen content, preferably an oxygen content equal to or less than 100 ppm by weight, more preferably less than 50 ppm by weight. The alloyed powder used for the additive manufacturing of the product according to the present invention is in the form of mainly spherical particles where the mean particle size of the powder is less than or equal to 300 µm. Preferably the mean particle size of the powder is greater than or equal to 20 µm and less than or equal to 280 µm but equal to or larger than 50 µm or equal to or larger than 100 µm. In one embodiment the particles have a size in the range of 50-150 µm. The alloy powder according to the present invention may be prepared by gas atomization.

The cobalt (Co) content in the alloy is equal to or greater than 14 weight % and equal to or less than 18 weight %. In one embodiment the content is equal to or greater than 15 weight % or equal to or greater than 15.5 weight % or equal to or greater than 16 weight %, preferably equal to or less than 17 weight %, or equal to or less than 16.5 weight %. In one embodiment the cobalt content is around 16 weight %. Cobalt is used for increased heat resistance (hot hardness) in the alloy.

The chromium (Cr) content in the present alloy is equal to or greater than 3.5 weight % to equal to or less than 4.5 weight %. In one embodiment the chromium content is around 5 preferably 5.0 weight %.

Tungsten (W) is present in the alloy at a content equal to or greater than 10 weight % and equal to or less than 12 weight %. In one embodiment the tungsten content is around 11 weight %. Tungsten forms carbides in the present alloy typically in the form WC or $W_6C$ which have a hardness of 2800 HV and 1600 HV, respectively. Tungsten is also present in the matrix, increasing the heat resistance of the alloy.

Carbon (C) forms carbides with the tungsten, chromium, vanadium and molybdenum present in the alloy and these carbides in turn provide mechanical strength, hardness and wear resistance to the 3D-printed product. Carbon is also present in the martensitic matrix structure. In one embodiment the carbon content of the alloy of the present invention is around 2.5 weight % preferably 2.50 weight %.

Molybdenum (Mo) is a metal that can replace tungsten and forms carbides in a similar way as tungsten. The content of Mo in the present alloy may be 4 and 6 weight % preferably equal to or greater than 4.5 and equal to or less than 5.5 weight %. In one embodiment the content of molybdenum is around 5.0 weight %.

Vanadium (V) forms mainly VC carbides in the present alloy which have very high hardness (around 2800 HV). The amount of vanadium is equal to or greater than 5.0 weight % and equal to or less than 8.0 weight % such 6.0 weight % to 7.0 weight %. In one embodiment the amount of V is around 6.3 weight %.

Besides unavoidable impurities the rest of the alloy is iron i.e. Fe balance. The amount of balanced iron depends on the amount of the other components. Typically the amount of iron is 50-60 wt %, preferably 52-58 wt %.

The oxygen content in the 3D printed product should be as low as possible. In the present invention the oxygen content is preferably 30 ppm or less, or 20 ppm or less.

The alloy may further comprise unavoidable amounts of impurities or traces of impurities of other elements. These elements may be but is not limited to niobium, nickel, manganese, silicon, boron, tantalum, or a combination thereof. The total amount of said other elements or impurities is preferably less than 1 weight %, or less than 0.5 weight %, or less than 0.05 weight %.

One advantage of the present invention is that it does not require the use of any organic binders or adhesives and therefore the 3D-printed product usually comprises a combined content of iron, vanadium, molybdenum, carbon, tungsten, chromium and cobalt which is equal to or greater than 95 weight %. In one embodiment of the invention the combined content of iron, vanadium, molybdenum, carbon, tungsten, chromium and cobalt is equal to or greater than 97 weight %. Preferably the combined content of iron, vanadium, molybdenum, carbon, tungsten, chromium and cobalt is equal to or greater than 98 weight %. More preferably the combined content of iron, vanadium, molybdenum, carbon, tungsten, chromium and cobalt is equal to or greater than 99 weight %. Most preferably the combined content of iron, vanadium, molybdenum, carbon, tungsten, chromium and cobalt is equal to or greater than 99.9 weight %. In one embodiment of the invention the amount of organic compounds in the 3D-printed product is equal to or less than 0.1 weight %. Preferably, the amount of organic compounds in the 3D-printed product is equal to or less than 0.05 weight %. In one embodiment of the invention the product is essentially free from any organic compounds. The carbon in the product is mainly in form of carbides such as tungsten and chromium carbides, but elemental carbon and elemental tungsten can also be present in the matrix.

The multiphase alloy comprises a matrix of mainly iron but also cobalt, chromium, tungsten, molybdenum and carbon. There are carbides of chromium, vanadium, molybdenum and tungsten, CrC-types, VC and WC or $W/Mo_6C$, present in the matrix. The carbides of the present invention are mainly $W/Mo_6C$ and VC and the total amount of said carbides is 20-30 volume % preferably 22-26 volume %. The carbides of the 3D printed product are evenly distributed (well dispersed) and the size distribution is narrow as seen in FIG. 1. The maximum carbide size of the 3D printed hardened product is 10 μm or less. In one embodiment the maximum carbide size is 5 μm or less, preferably 3 μm or less. The average carbide grain size is usually 5 μm or less, or 3 μm or less or 1 μm or less. In one embodiment the maximum carbide size is 3 μm or less and the average carbide grain size is 1 μm or less.

Metal compounds that contain carbides sometimes suffer from that carbides forms clusters, dendritic or net structures which makes the material more brittle. Typically in these types of alloys, especially with high chromium and carbon chromium forms carbides (such as $Cr_7C_3$ and $Cr_{23}C_6$ but also other stoichiometric types). These carbides typically grow quickly in solidification stage which results in large and long stringers with dimensions from 100-1000 μm in size. These large carbides reduce the macro fracture toughness and fatigue resistance in the material. Therefore, one of the advantages of the present invention is that the 3D-product contains carbide grains or particles that are in general smaller than those found in the prior art and are well-dispersed in the matrix. This is a result of the method according to the present invention.

One advantage of the present invention is the achievement of improved mechanical properties of the 3D-printed product. The hardness of the hardened product (austenitizing at 1180° C., followed by tempering three times at 560° C. for 1 h and then air cooled, the temperature between the temperature stages was below 25° C.) may be at least 1050 HV2 kg, such as at least 1075 HV2 kg, or at least 1100 HV2 kg, or at least 1125 HV2 kg. In some embodiments the hardness is 1075-1175 HV2 kg or 1100-1150 HV2 kg. The hardness was determined by using a 2 kg Vickers indention.

Without being bound by theory, the mechanical properties of the present invention are believed to be a result of the fine microstructure of the product. The 3D-printed product is essentially free from dendritic structures of carbide grains. The carbide grains are small in size and they are evenly distributed within the matrix as seen in the figures. The alloy of the 3D-printed hardened product usually does not comprise any or only very few carbides having a size equal to or larger than 15 μm. Instead the average size of the carbides is equal to or less than 10 μm, or equal to or less than 5 μm.

Not only does the present invention facilitate the preparation of products and components that have improved mechanical properties, it also makes it possible to prepare products with advanced or complex three-dimensional shapes and forms. The product may comprise cavities, channels or holes and the product may have curved portions or spiral forms. These shapes or forms are prepared without any removal of the alloy besides any optional after treatments. The cavities, holes or channels may be curved, that is to say that their surfaces may be curved, helical or spiral or the like. In some embodiments the product contains cavities where the cavities are sealed or have an opening wherein the diameter or width of the opening is less than the diameter or width of the underlying cavity. The product may be a cutting tool such as a milling cutter, shaper cutter, power skiving cutter, drill, milling tool etc., or a forming tool such as extrusion head, wire drawing die, a hot rolling roll, etc., or wear components such as pumps or valve components, gliding or roll bearing rings, etc. The product according to the present invention also has good high temperature working properties such as wear resistance at high temperature.

The Method

Products according to the present invention are prepared by three-dimensional printing (also known as free forming, additive manufacturing) of an alloy powder. The method uses a free forming apparatus (a 3D-printer) having a chamber in which the powder is arranged. The method of free forming comprises forming a layer of a powder of an alloy in an oxygen-low environment in the chamber as defined below. One suitable free forming apparatus is an electron beam apparatus (EBM) from Arcam such as the ARCAM A2X. The alloy comprises carbon, tungsten, molybdenum, chromium, vanadium and cobalt in the amounts described above and the choice of alloy depends on the desired properties of the final product. The content of oxygen and other impurities in the reactor should be as low as possible, such as equal to or less than 10 ppm (corresponding to a gas purity grade 5), or equal to or less than 1 ppm (corresponding to a gas purity grade 6) and the environment in the reactor may comprise inert gases such as argon or helium.

There may also be a vacuum in the reactor where the pressure in the reactor may be $1 \times 10^{-4}$ mBar (0.01 Pa) or less, or $1 \times 10^{-3}$ mBar (0.1 Pa) or less. In one embodiment the initial pressure in the reactor is around $1\text{-}10 \times 10^{-5}$ mBar ($1\text{-}10 \times 10^{-3}$ Pa) and then an inert gas such as helium or argon is added to increase the pressure to $1\text{-}5 \times 10^{-3}$ mBar (0.1-0.5 Pa). The powder is then melted locally by exposing the powder to an energy beam during a period of time sufficient to melt it. The energy beam may be a laser beam or an electron beam. The beam is swept across the powder in a pattern. The duration of the sweep may range from seconds to minutes depending on the alloy and the size of the particles in the powder. The melted powder is then allowed to at least partly solidify into a multiphase metal alloy. Another layer of powder may then be applied on top of the solidified alloy.

In order to avoid crack formation the product and for improving the properties of the same the product is maintained at an elevated temperature during the printing or the formation of the 3D-printed product. Crack formation is probably due to a combination of increased internal stresses and increased material brittleness at lower temperatures. The increase in internal stresses is caused by the volume changes at the phase transformations and also ordinary thermal expansion. The elevated temperature to avoid crack formation may be 300° C. or higher, or 400° C. or higher, or 500° C. or higher, or 550° C. or higher, or 600° C. or higher, or 700° C. or higher, or 800° C. or higher, or 900° C. or higher, but usually not higher than 1100° C. For example the base plate or the working table that the product is built on may comprise a heater. The 3D-printed product may therefore have a temperature gradient in it during the building of the product and the heating should be controlled so that the temperature of the built product during the building process is preferably 600° C. or higher, or 700° C. or higher, or 750° C. or higher, but usually 900° C. or lower or 850° C. or lower, or 800° C. or lower. In one embodiment the temperature is 720° C.-790° C. such as 780° C. The temperature should of course be low enough for the melted powder to at least partly solidify. The present invention allows a lower temperature which not only makes the method cheaper but may also have a positive influence on the microstructure.

The 3D-printed product may then be hardened by heating the product to 1000-1200° C. typically 1180° C. and then cool it to 25-50° C. (typical minimum cooling rate 7° C./s between 800-1000° C.). The product is then tempered at 500-600° C., such as at 520° C. to 560° C., by keeping the product at said temperature for a sufficient period of time. The tempering is preferably done three times for 1 h each time with cooling to room temperature between each tempering. The obtained hardness of the material may then be at least 1050 HV2 kg as disclosed above.

Figure 3:
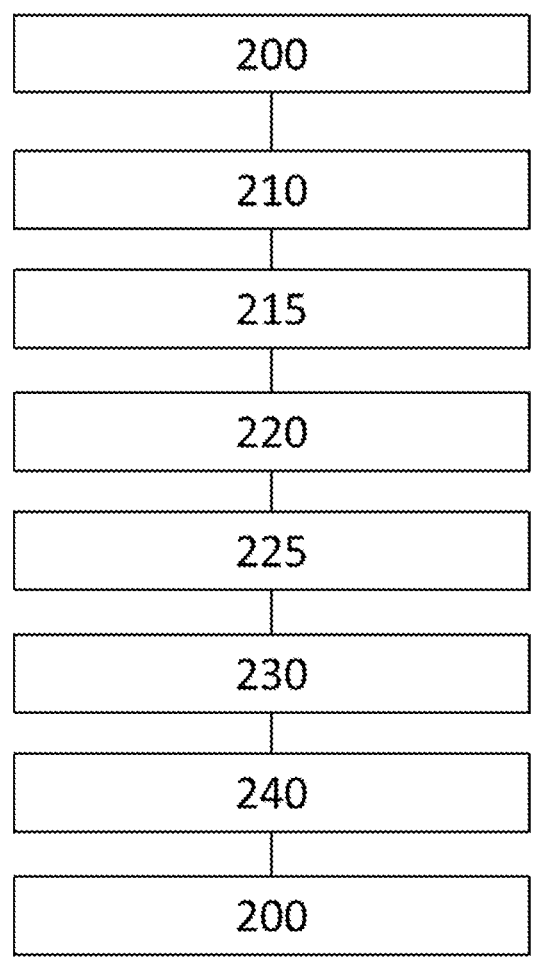
FIG. 3, schematic figure of an embodiment of the method of the invention.

FIG. 3 illustrates a flow diagram of the steps of an embodiment of a method according to the present invention for preparing one layer. The method for manufacturing a metallic multiphase material starts in step 200. In step 210, a powder material of an initial metallic multiphase material is provided. The build platform is then heated, by a scanning beam or by another external heating method step 215. The initial metallic multiphase material comprises a metal matrix in which carbides are embedded. Before starting the processing oxygen is removed from the environment and the build support is pre-heated 215. The powder of the initial metallic multiphase material is placed in step 220 in an oxygen-low environment as previously defined. The powder of the initial metallic multiphase material is preferably first preheated in two steps 225 to maintain the temperature and then locally melted in a first portion in step 230. In step 240, the final metallic multiphase material is solidified. The method ends in step 299.

Figure 4:
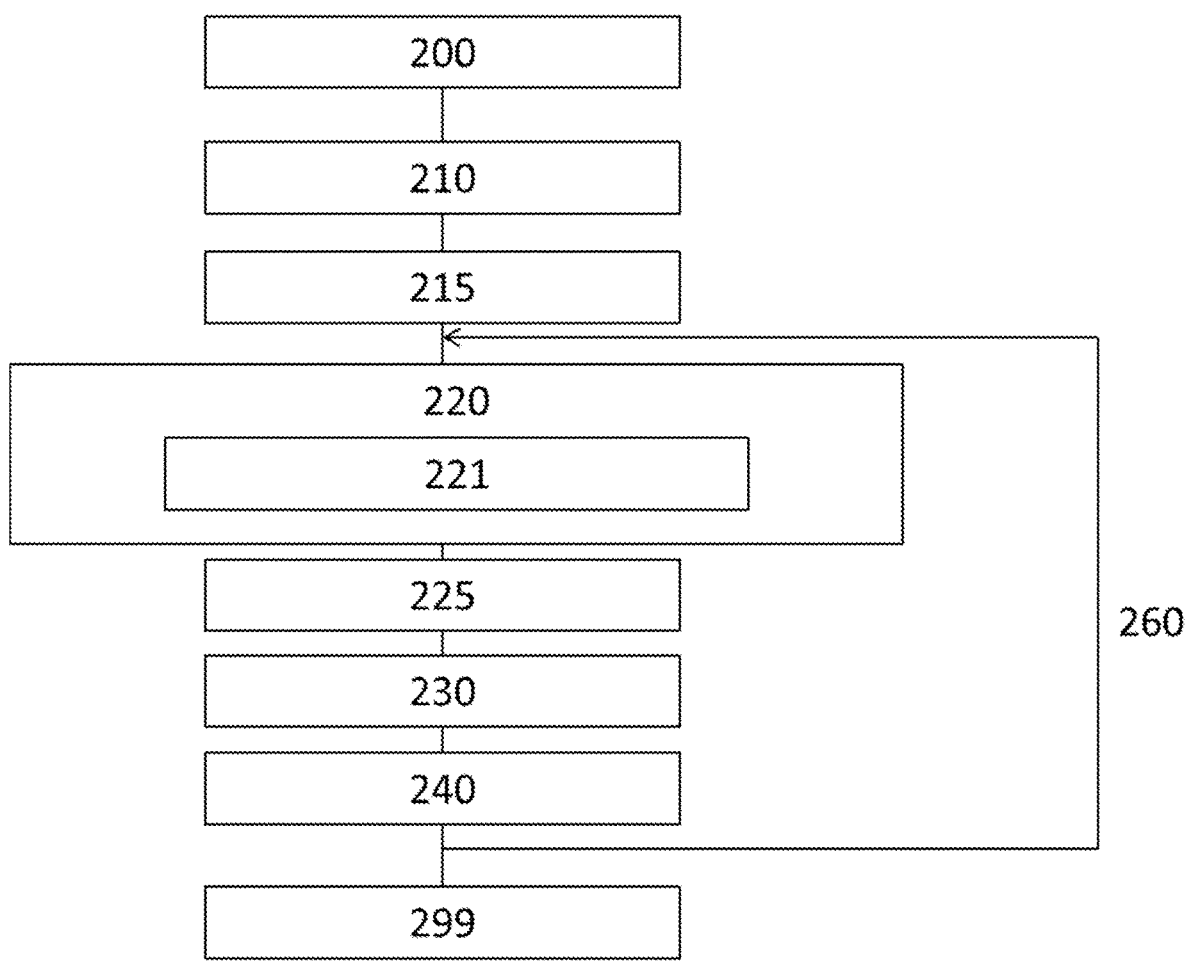
FIG. 4, schematic figure of an embodiment of the method of the invention.

FIG. 4 illustrates a flow diagram of steps of another embodiment of a method for producing a 3-D product according to the present invention. The method for manufacturing of an object of a metallic multiphase material starts in step 200. Preferably a continuous preheat of the metal powder bed is performed in two steps 225, PreHeat1 and PreHeat2, where the PreHeat1 is performed on the whole build plate or base plate area with an energy beam (with a beam energy of e.g. of 30-40 mA and repeated 3-10 times), and the PreHeat2 is performed on and nearby the intended following melting zone area (e.g. with a beam energy 35-45 mA, repeated 3-10 times). The purpose of the pre-heating steps is to maintain the elevated temperature of the build and then to sinter the newly added powder to the underlying layer. This method comprises all the steps 210, 215, 220, 225, 230 and 240 of the method for manufacturing of a metallic multiphase material of FIG. 3. The step 220 comprises in this embodiment a step 221 in which a thin layer of the initial metallic multiphase material is provided in the oxygen-low environment as described above. Preferably, the process is repeated from step 220 as indicated by the broken arrow 260 until a complete object is achieved and the method is ended in step 299.

The advantage of using EBM in comparison with laser is that thicker powder layers may be prepared and powders with larger particles may be used.

The growth of the carbides occurs during the solidification of the molten material and in order to limit the size of the carbides the growth time should be limited. The solidification time is mainly influenced by the heat diffusion rate, the heat of solidification and the heat diffusion distance. The solidification rate in traditional casting techniques may be enhanced by cooling down the melted material using any suitable technique, such as casting in highly-cooled refractory molds or to cast smaller details. Also, in existing prior art cladding techniques the cooling speed is also high, but not high enough to prevent carbide growth or to receive a fully dense material, as shown in prior art market study part.

However, the present alloy and the present method generates a melt pool (a pool of melted alloy) during the 3D-printing which has a diameter that is equal to or less than 2 mm in diameter, usually equal to or less than 1 mm, or equal to or less than 0.5 mm, or equal to or less than 0.25 mm. A smaller melt pool results in shorter solidifications times and thereby smaller carbides, and in the present invention the melt pool size is many times smaller and very much more rapidly cooled than in traditional techniques. The present invention also results in the possibility to produce large components. For example the present method allows the preparation of components or products having a weight of 1 kg or more.

The surface of the obtained 3D-printed multiphase metal alloy has a rough surface and the 3D-printed products may have some powder residues on their surfaces. Therefore the method may further comprise an after treatment which may involve heating or surface treatment. The heat treatment may further increase the mechanical properties of the product. The method may further comprise a step comprising finishing the surface of the obtained product by grinding, electron discharge machining (EDM), polishing or any other suitable method. Such surface treatment may be used for example to provide a nicer finish, sharp edges and smooth surfaces. The 3D-printed product of multiphase metal alloy may also be heat treated as described above and followed by a surface treatment such as EDM.

Figure 5:
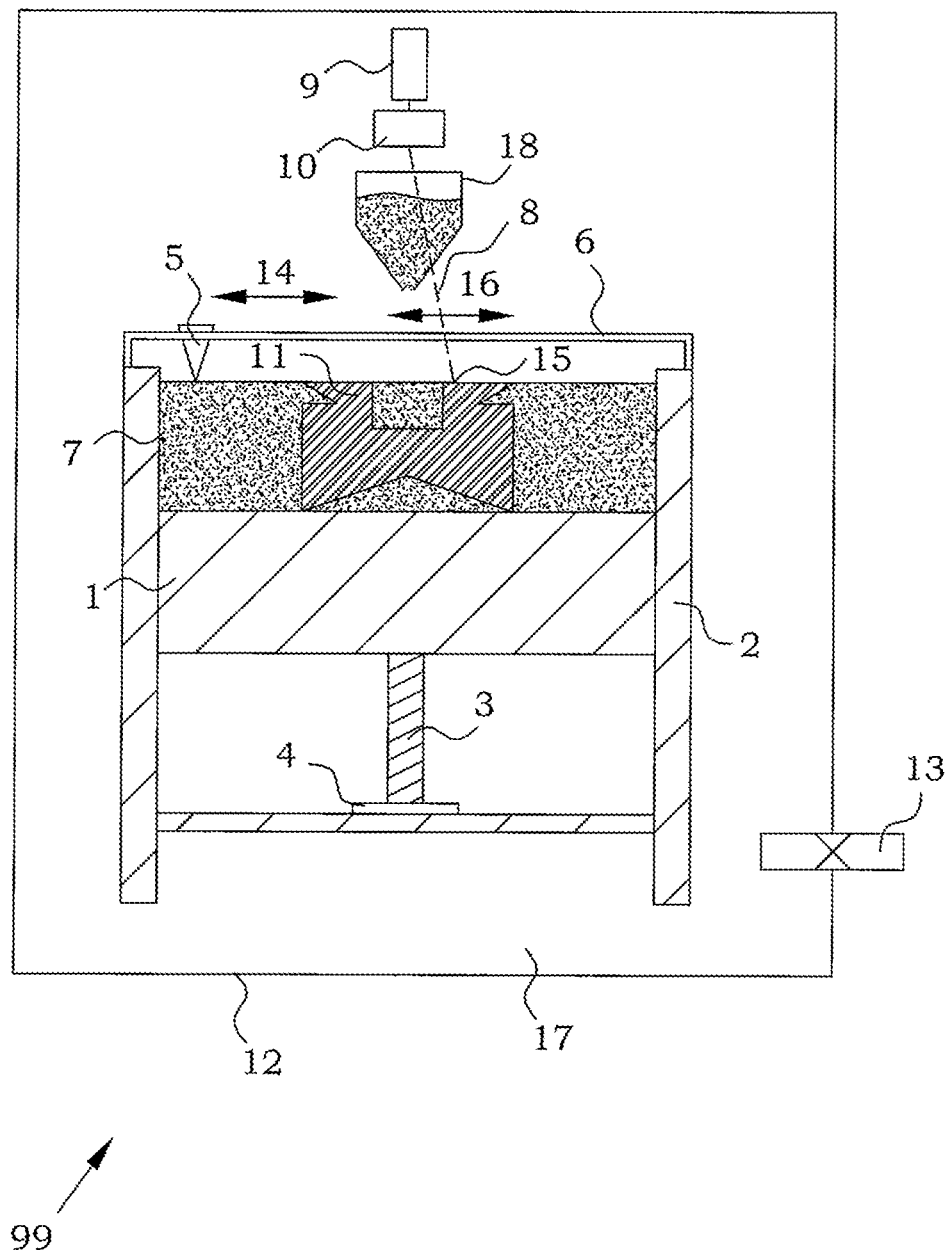
FIG. 5, a schematic cross sectional view of an embodiment of a chamber of an apparatus that may be used to prepare the 3D-printed product or conduct the method according to the present invention.

FIG. 5 describes an embodiment of a configuration of a machine arrangement 99 suitable for producing components or objects in this new material. The machine arrangement 99 comprises an adjustable working table 1, vertically movable and placed inside a bin 2. The vertical position of the working table 1 is finely adjustable between a minimum and maximum height and is typically adjusted by a screw 3 and a screw-nut 4 or other actuator means. A powder-containing container 18 is arranged to add powder to the top of the present build. A powder rake 5 is arranged to be movable, as indicated by the arrow 14, back and forth in a chute 6 over the working table 1. The powder-containing container 18 comprises powder of an initial metallic multiphase material. During the motion of the powder rake 5, the powder rake 5 distributes the metal powder into a metal powder layer 7 on top of any structures present on the working table 1.

An energy beam source 9, e.g. laser or an electron gun generates an energy beam 8 with a high energy density. The energy beam 8 can for example be a laser beam or an electron beam or a combination thereof. A beam controlling unit 10 focuses and positions the energy beam 8 onto a particular spot 15 on the top of the powder layers 7. A controlling computer (not shown in FIG. 5) controls the working table 1, the motion of, and the distribution of powder by, the powder rake 5, the energy beam 8, and the beam controlling unit 10. The controlling computer can thereby cause, as indicated by the arrow 16, the spot 15 to move over the surface of the metal powder layers 7. The melting and the following solidifying of the focused-on initial metallic multiphase material are thereby repeated for additional portions of the initial metallic multiphase material of the powder layer 7. At the same time, the energy density and focus of the energy beam 8 can be varied as desired. The energy beam 8 is intended to cause a local melting of the metal powder 7 at the spot 15, and when the energy beam 8 is moved over the surface, a solid component 11 (or a plurality of components) made of the melted and solidified metallic multiphase material is successively built up. The controlling computer has information about the dimension and geometry of the component(s) 11 under construction. Preferably this is in the form of slices, each of which has a thickness which corresponds to the thickness of a powder layer and for each powder layer the computer controls the heating/melting of the energy beam based on the information related to the actual slice being formed. When all parts of the current metal powder 7 surface that should be integrated into an object that is to be manufactured have been melted and solidified and thereby joined to form the common body of the produced component 11, the build platform is lowered, and powder containing container 18 releases new initial metallic multiphase material and the powder rake 5 is again moved over the working table 1, distributing a new layer of metal powder. The local melting and solidifying is reiterated on the new layer of initial metallic multiphase material placed over the common body. Further reiterations of this local melting and solidifying result in the formation of a three-dimensional object or component 11.

In an alternative embodiment, the motion of the energy beam could be achieved by mechanical means, preferably controlled by a controlling computer.

The temperature of the component is, as indicated above, of importance. During the main time of the manufacturing, each portion of the component should be kept at a temperature low enough to enhance the conduction of heat away from the melt and thereby increase the solidification rate. However, in order to get a good adhesion of melted material to the common three-dimensional body, the temperature should not be too cold. The temperature of a body under construction needs to be kept at an elevated temperature as discussed above, such as higher than 300° C. Such parameters for an optimized temperature are strongly dependent on a number of factors but in the present invention the temperature must be kept high to avoid cracks. A higher substrate temperature, at least at the surface, can be obtained by scanning the energy beam over the surface of the powder layers for pre-heating of the powder, before the actual local melting takes place as described above. This step may be combined with heating of the working table. A lower substrate temperature can in a similar way be achieved by cooling the working table. Thereby, the final metallic multiphase material can be cooled in-situ at least during the solidification step following the local melting step.

Figure 6:
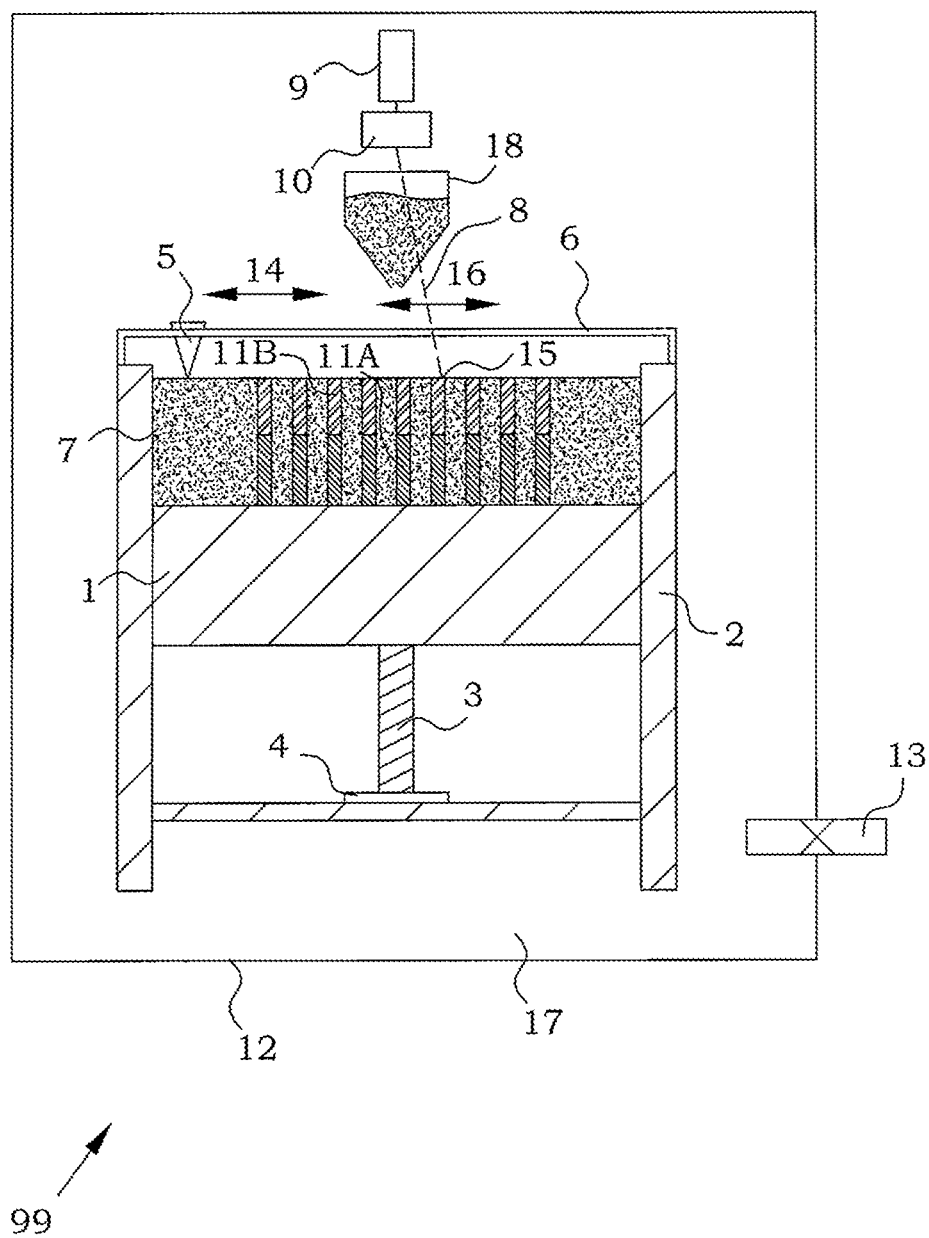
FIG. 6, a schematic cross sectional view of another embodiment of a chamber of an apparatus that may be used to prepare the 3D-printed product or conduct the method according to the present invention.

FIG. 6 shows another embodiment of a machine arrangement 99 suitable for manufacturing according to the present invention. In this embodiment pre-produced details 11A are placed on the working table 1. The pre-produced details 11A could be a base material of any kind made in another process, it can be a base material with another composition, or it can also be e.g. a worn tool that is to be rebuilt. In this embodiment, the pre-produced details 11A are positioned on the working table before the 3-D printing process starts and the interior of the chute up to the level of the first spot to which new material is to be added is filled with material, typically the metal powder. The new material 11B is then added on top of already existing substrate. In other words, the powder is placed on top of a pre-produced solid support object, wherein the produced common body becomes attached to this support object. This support object could be e.g. an object to be repaired. In such an embodiment, the controlling computer might be provided with details of the position and material parameters of the pre-produced detail 11A.

The embodiments of FIGS. 5 and 6 can also utilize the same techniques to form components with negative surfaces. A negative surface is characterized in that a surface normal is directed downwards into a volume beneath the surface not comprising the same material as built in the component 11, i.e. typically unmelted metal powder. The working table 1 is shown, with a component 11 under construction on top. This component 11 has a negative surface 21. The method for creating such negative surfaces includes a procedure where the area over which the energy beam is moved for one iteration covers horizontal positions that are not covered by a corresponding area from a previous iteration. In this manner any shape of an outer surface can be created. The possibility to create negative surface allows manufacturing of details having shaped surfaces with surface normal directions differing by more than 180 degrees.

Therefore, holes and channels can be successfully formed by this technique. The component 11 of this embodiment comprises an internal channel 22. The channel is formed by successively adapting the area where the powder is melted to build a curved positive surface 23. The channel 22 is then covered by a curved negative surface 24. Such channels can advantageously be used, for example, for transporting cooling or heating media in the object during final use. The product or component may have a cavity or a channel and the cavity may be sealed or may have an opening with a diameter that is less than the diameter of the sealing. The angle of the curved channel may be more than 15°, or more than 30°, or more than 45°.

When using the technique described to build the new material, it is also obvious that the technique allows the building of several components (of the same type, or of different types) in the same chamber during the same run. It is only necessary to provide the controlling computer with the information necessary to determine where to build an object, and it is obvious that an object can be a single component or a part of one of several individual components.

In a typical non-limiting example shown in FIG. 6 the melting beam current in the cross-hatched area is continuously automatically varied by the machine to fulfill the automatic heat balance in the actual build. The maximum setting is typically 25-30 mA, such as 28 mA. In the cross-hatched area, the focus offset may be set to 8-12 mA such as 10 mA and the melting speed is also continuously varied by the machine to fulfill the different heating demands on each spot in the build (which can depend, for example on whether the spot is close to a border, a negative surfaces, etc.).

EXAMPLES

Example 1

A sample was 3D printed from a powder having the composition of (weight %) (Fe bat)

| C | Cr | Mo | W | Co | V |
|---|---|---|---|---|---|
| 2.50 | 4.0 | 5.0 | 11.0 | 16.0 | 6.3 |

The 3D-printed alloy was prepared in an electron beam 3D-printing machine, an Arcam A2X, with a build plate start temperature of 780° C. The powder layer thickness was 100 μm and the vacuum chamber had an average pressure of about 0.003 mBar with standard helium addition. The powder used had the specified composition and a powder size fraction of 50-150 μm. The continuous preheat of the metal powder bed is performed in two steps, PreHeat1 and PreHeat2, where the PreHeat1 is performed on the whole build plate area with a beam energy of 36 mA, repeated 6 times, and the PreHeat2 is performed on and nearby the intended following melting zone area with a beam energy 42 mA, repeated 6 times. These settings lead to a high build temperature during the whole build, Heat Treatment The material was heat treated in three different cycles:
H1: Hardening in vacuum furnace with austenitizing at 1180° C. followed by tempering 3 times at 560° C. in 1 h, followed by air cooling. The temperature between the tempering stages was controlled to be below 25° C.
H2: Hardening in vacuum furnace with austenitizing at 1180° C. followed by tempering 3 times at 520° C. in 1 h, and then followed by air cooling. The temperature between the tempering stages was controlled to be below 25° C.

Sample Preparation

The material analysis was performed on hardened material pieces by cutting out three different material samples from different 3D printing batches on different material geometries (smallest part 010 mm cylinder with height 10 mm and largest part a gear cutting hob with 0102 mm and height 275 mm), grinding and polishing by standard material analysis method with final grinding with SiC P4000. In this stage, the hardness was measured on several places from the pieces with the same result.

The samples were further treated to facilitate the carbide volume measurements. This preparation was further polishing by 1 μm diamond in 5 minutes, followed by Struers OP-S solution (40 μm $SiO_2$ at pH 9.8), a well-known method to facilitate carbide structure analysis.

Hardness Measurements:

After heat treatment and sample preparation, the hardness was measured. The hardness was measured with a Vickers indenter at a standard institute at 5 different separate points per sample at 2 kg indentation weight. The results were as below:

TABLE 1

Hardness after heat treatment.

| Heat treatment | Hardness [Vickers indentations, 2 kg load] | Approximate Rockwell hardness |
|---|---|---|
| H1 | 1088 | 71.9 |
| H2 | 1132 | 72.6 |

Microstructure and Carbide Volume Measurements

The microstructure was analyzed in the Scanning Electron Microscope as shown in the images. The microstructure of the material showed both surprisingly high carbide content and very small carbide grain size, see example in FIG. 1.

The carbides were calculated by taking the microstructure seen in FIG. 1 and marking the borders on single carbides. The result could be seen in FIG. 2.

Figure 2:
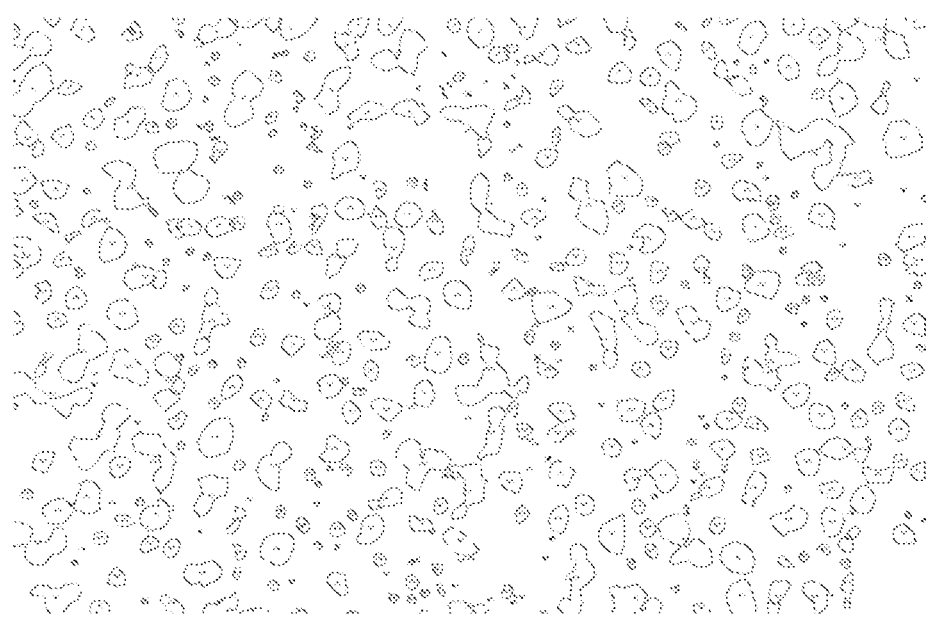
FIG. 2, the microstructure of FIG. 1 with marked borderlines of the carbides.

When calculating the covered area, including all carbides marked as seen in FIG. 2, the total area is 24.36% and the average carbide grain size is 0.92 μm. The calculated cross section area could then be suggested to show the same carbide volume, that is: this new alloy consists of 24.36% carbides. The average grain size is of course dependent on that some of the largest calculated areas in particular are carbide clusters of several grains.

The oxygen content was determined to be 18 ppm.

In a typical very highly alloyed conventional PM-high speed steel material, such as ASP2060, the total carbide volume is approximately 19 vol % (5% $M_6C$ type and 14% MC type).

Example 2

A test for analyzing the abrasion resistance was performed using a commercial dimple grinder (Gatan), having a grinding wheel rotating on a horizontal axis pressed onto a sample rotating on a vertical axis. A diamond slurry, average particle size of 2.5 μm, was introduced into the wear zone before each run. A fixed load of 20 g was applied to the grinding wheel once it contacted the sample. Each test had a duration of 500 wheel rotations which adds up to a total sliding distance of approximately 31 m. For statistical purposes the test was repeated three times per sample.

Cubes of the three test materials were prepared with testing surfaces, approx. 6×6 mm, ground and polished to a surface roughness of Ra-3 μm. The wear rates were given by measuring the removed (abraded) material volume by white light optical profilometry.

One commercial Powder Metallurgy High Speed Steel grade (PM-HSS) grade was compared with the new high hardness 3d printed product. The commercial PM-HSS alloy was an ASP® 2053 alloy, with a specified composition of 2.48 wt % C, 4.2 wt % Cr, 3.1 wt % Mo, 4.2 wt % W, 8 wt % V and the rest Fe. This PM-HSS alloy is known for its superior wear resistance, based on a high level of Vanadium carbides.

The average hardness was measured with three Vickers indentations on polished surfaces using 1 kg load. The results are presented in table below:

TABLE 2

Hardness of 3D printed product according to the present invention and a commercially available alloy.

| Grade | Hardness [HV 2 kg] | Wear volume [mm3] |
|---|---|---|
| 3D printed alloy | 1040 | 0.0048 |
| ASP 2053 | 896 | 0.0052 |

This test shows 8% reduction of abrasive wear, which indicates the extremely good wear resistance of the new alloy.

The invention claimed is:

1. A 3D-printed product made of an alloy comprising a metal matrix and grains of carbides embedded in the metal matrix;
   wherein the alloy comprises
   Carbon: equal to or greater than 2.47 and equal to or less than 2.55 weight %,
   Tungsten: equal to or greater than 10 and equal to or less than 12 weight %, Chromium: equal to or greater than 3.5 and equal to or less than 4.5 weight %
Cobalt: equal to or greater than 14 and equal to or less than 18 weight %;
Molybdenum: equal to or greater than 4 and equal to or less than 6 weight %;
Vanadium: equal to or greater than 5 and equal to or less than 8 weight %;
Iron: balance;
wherein the oxygen content is 30 ppm or less;
wherein the total amount of carbide is 20-30 volume %; and
wherein the maximum carbide size is less than 10 µm.

2. The product according to claim 1 wherein the product comprises Carbon: equal to or greater than 2.47 and equal to or less than 2.55 weight,
Tungsten: 11 weight %;
Chromium: 4 weight %;
Cobalt: 16 weight %;
Molybdenum: 5 weight %;
Vanadium: 6.3 weight %;
Iron: balance; and
wherein the total amount of carbides is 20-30%.

3. The product according to claim 1 wherein the total amount of carbides is 22-26 volume %.

4. The product according to claim 1 wherein the maximum carbide size is less than 5 µm.

5. The product according to claim 1 wherein product has a hardness of at least 1050HR2 kg.

6. The product according to claim 1 wherein the product has a cavity or a curved channel.

7. The product according to claim 6 wherein the cavity is sealed or has an opening wherein the diameter or width of the opening is less than the diameter or width of the underlying cavity.

8. The product according to claim 1 wherein the product is a cutter.

9. The product according to claim 1 wherein the product is a milling cutter.

10. The product according to claim 1 wherein the product is a power skiving cutter.

11. The product according to claim 1 wherein the product is a drill.

12. A method of preparing a 3D-printed product in a free forming apparatus having a chamber comprising:
 a. forming a layer of a powder of an iron based alloy in an oxygen-low environment in the chamber wherein the alloy comprises:
  Carbon: equal to or greater than 2.47 and equal to or less than 2.55 weight %,
  Tungsten: equal to or greater than 10 and equal to or less than 12 weight %,
  Chromium: equal to or greater than 3.5 and equal to or less than 4.5 weight %
  Cobalt: equal to or greater than 14 and equal to or less than 18 weight %;
  Molybdenum: equal to or greater than 4 and equal to or less than 6 weight %;
  Vanadium: equal to or greater than 5 and equal to or less than 8 weight %;
  unavoidable amounts of impurities;
  Iron: balance; and
  wherein the powder comprises spherical particles;
 b. melting the powder locally by exposing the powder to an energy beam during a sufficient period of time to form a melt pool; and
 c. letting the melted powder in the melt pool solidify into a multiphase alloy;
 d. optionally preparing an additional layer of powder on top of a previous layer by repeating the steps a-c wherein step a comprises placing the powder on top of the previous layer;
 and wherein the product being built is kept heated above 600° C. during the method
 e. optionally hardening of the obtained product.

13. The method according to claim 12 wherein the product being built is kept heated at a temperature of 720° C. to 780° C. during the method.

14. The product according to claim 1 wherein the product comprises
Carbon: 2.50 weight %,
Tungsten: 11 weight %;
Chromium: 4 weight %;
Cobalt: 16 weight %;
Molybdenum: 5 weight %;
Vanadium: 6.3 weight %;
Iron: balance;
wherein the total amount of carbides is 20-30%; and
wherein the maximum carbide size is less than 10 µm.

15. The product according to claim 1 wherein the total amount of carbides is 24-25 volume %.

16. The product according to claim 1 wherein product has a hardness of at least 1100HR2 kg.

* * * * *